Patented July 1, 1952

2,602,082

UNITED STATES PATENT OFFICE 2,602,082

ALDEHYDE REACTION PRODUCTS

William L. Owen, Baton Rouge, La.

No Drawing. Application May 1, 1950,
Serial No. 159,375

27 Claims. (Cl. 260—209)

The present invention is directed to the treatment of gum dextran to confer thereon the property of forming viscous solutions, and more particularly to the conditioning of dextran which has been produced by fermentation of an aqueous solution of a polysaccharide in the presence of a bacterium, and especially by the genus *Leuconostoc mesenteroides* (Cienkowski) Van Tieghem, Bergey's Manual Determinative Bacteriology, fifth edition.

The yield of gum dextran produced by the above fermentation process can be materially increased by supplying proper nutrients, including autolyzed yeast, as set forth in applicant's prior Patent No. 2,392,258, granted January 1, 1946.

The gum dextran produced by the fermentation of a fermentable sugar including sucrose in the form of either refined or raw cane sugar or refined beet sugar, or molasses, has the formula $(C_6H_{10}O_5)n$, and is a mucilaginous substance which can be precipitated from aqueous solution by the alcohols and other dehydrating agents. However, the gum dextran which is precipitated is sticky, tenacious, and extremely difficult to handle. Further, aqueous colloidal suspensions of the gum dextran have a very low viscosity, and as to this property can not be compared with the natural gums such as gum karaya, tragacanth and the locust bean gum.

It may be pointed out that an almost unlimited field for the industrial utilization of gum dextran may be developed if the gum dextran can be recovered in the form in which it possesses a high viscosity potential, that is, comparable with the natural gums such as those above set forth. When gum dextran is formed by fermenting an aqueous substrate with a culture of species *Leuconostoc mesenteroides* (Cienkowski) Van Tieghem, the gum dextran which is produced in the substrate frequently, but not always, assumes such a thick high viscous state that it can not be poured from the container in which it is formed.

Gum dextran may be produced by employing the following aqueous substrate:

| | |
|---|---|
| Cane sugar | grams 150 |
| Tryptone | do 10 |
| Yeast extract | do 1 |
| Water | cubic centimeters 1000 |
| Di-potassium phosphate | grams 1 |

However, when the gum dextran is treated with a precipitating agent, as for example, ethyl or isopropyl alcohol in the proportion of two volumes of alcohol to one of the cultured substrate, the precipitated gum when made up with water equivalent to the original volume of the cultured substrate, produced a solution which had practically no viscosity. While ethyl or isopropyl alcohol in specific proportions have been set forth as the precipitating agent, it is to be understood that other precipitating agents and other proportions can be used and the resulting precipitated gum dextran in aqueous solution will have very little viscosity. It is, therefore, quite clear that the nature and constitution of the gum dextran precipitated from a sugar containing substrate which has been fermented by bacteria of the character set forth, has been changed by precipitation and has different properties than are possessed in its originally formed state.

It has been discovered that the viscosity potential of a gum dextran produced by fermenting a polysaccharide substrate with bacteria, and especially by the genus *Leuconostoc mesenteroides* (Cienkowski) Van Tieghem, as herein disclosed and as disclosed in Patent No. 2,392,258, the disclosure of which is hereby incorporated in the present application, can be increased by treating the aqueous colloidal suspension of the gum dextran with an aldehyde and especially saturated aliphatic aldehyde. The aldehydes in general react with a gum dextran to form aldehyde complexes. These aldehyde complexes may be then treated with a precipitating agent, as for example a monatomic aliphatic alcohol, and the precipitated material then dries easily, is not sticky, and has many of the properties of gum tragacanth as regards its ability to produce a high viscosity in aqueous suspension. Instead of using alcohol or other chemical as a precipitating agent, the gum dextran aldehyde complex present in the substrate can be recovered therefrom by mechanical means, as for example by centrifugence. The recovered gum dextran complex exhibits higher viscosities in aqueous solution at low concentrations than unaldehyded gum dextran, and further is less mucilaginous and tacky than unaldehyded gum dextran. Gum dextran recovered from substrates of the character herein set forth has relatively little viscosity in aqueous solution at low concentrations, and is a sticky mucilaginous material. The gum dextran-aldehyde product of the present invention produced as hereinafter set forth in any of its variations, is characterized by the property of being soluble in water.

It has also been discovered that in order to obtain the highest yields of extracted gums from substrates or mashes containing a polysaccharide, as for example sucrose, and which have been fermented, the fermented substrate should preferably be dehydrated before the addition of the aldehyde. Not only does this increase the yield of the gum dextran produced by the fermentation process as above set forth, but the dehydration of the fermented material before the addition of the aldehyde has a decided effect on increasing the viscosity potential of the gum dextran after its precipitation from the fermentable medium and the solution thereof or suspension thereof in an aqueous vehicle or carrier.

The fermented aqueous substrate produced in the manner herein set forth or as set forth in applicants' prior Patent No. 2,392,258, may be subject to a freezing step and then the frozen cultured substrate may be thawed before treatment of the fermented substrate with the aldehyde, as for example a saturated aliphatic aldehyde broadly and specifically of the character hereinafter set forth; or, alternatively, the culture fermented substrate of the character set forth may be boiled and then cooled before it is treated with the aldehyde.

The freezing of the material may be carried out in any manner whatsoever which will effect the freezing, but it has been discovered that it is highly advantageous to freeze the material with Dry Ice which is solid carbon dioxide. The Dry Ice not only functions to freeze the culture substrate, but also contributes significantly to the viscosity of the extracted material by saturating the fermentable substrate with carbon dioxide, that is $CO_2$ gas. Since the aledhydes used to treat the fermented substrate are active reducing agents, the $CO_2$ gas from the Dry Ice tends to remove all the oxygen from the culture fermented substrate, and thereby accelerates the formation of aldehyde complexes upon the subsequent addition of the aldehyde complexes. The freezing of the fermented substrate, as for example a mixture of cane sugar, tryptone, yeast extract, water, and di-potassium phosphate, to which there has been added a culture of species *Leuconostoc mesenteroides* (Cienkowski) Van Tieghem, is desirably accomplished before the fermentation of the above aqueous substrate or any equivalent aqueous substrate has progressed too far, that is, before the viscosity of the substrate has increased to too great an extent. In other words, the aqueous extract is dehydrated, that is frozen, before the aqueous extract becomes too viscous. When the specific aqueous extract above set forth is incubated at a temperature between 25° and 30° C. at the end of 48 hours, the solution is so viscous that it appears like a solid mass of jelly and only can be shaken with great difficulty from the vessel in which the fermentation is carried out. Therefore, the dehydration, that is the freezing or the boiling of the cultured substrate, should take place before the fermented mass has assumed a highly viscous state.

It has been discovered that by freezing or boiling the cultured substrate before treatment with the aldehyde, the gum dextran produced by fermentation is partially dehydrated, and more easily precipitated. After the frozen substrate is allowed to thaw, or after the boiled substrate is cooled, the boiling removing or greatly reducing the water content of the substrate, the frozen or boiled material does not quickly re-absorb water.

It may be pointed out that the most desirable method of removing water from the gum dextran which has been treated with the aldehyde and then precipitated by any of the precipitating agents previously used in the art, is to subject the so-treated gum dextran complex to the action of a high speed centrifugal usually of the basket type. This removes the water from the gum and the latter can then be further dried at low temperature. One suitable procedure is to decant most of the liquid from the precipitation vessel after the addition of the precipitating agent which is usually an alcohol, and then to transfer the precipitated material to the centrifugal apparatus. Preferably, although not necessarily, after decantation, the material may be washed with alcohol and then subjected to centrifugal action to further remove water and dehydrate the precipitated gum dextran complex. Usually the time required to dehydrate the material will vary from 20 to 30 minutes when the centrifugal operates at an R. P. M. of approximately 5,000. However, this time of dehydration in the centrifugal and the speed of rotation of the centrifugal are merely exemplary, and it is obvious that the invention is not limited to these specific times of treatments or speeds of treatment. These are merely given by the way of illustration, and not by the way of limitation. The material may be removed from the centrifugal by scraping the surface of the filter pad thereof. Thereafter, the material is allowed to ripen by subjecting the same to a current of an oxygen containing gas, as for example air, although not limited thereto. Preferably, the ripening temperature should not exceed 105° F., and is usually between 85° F. and 105° F., although here again the temperature may vary. The oxygen-containing gas not only oxidizes but ages the gum dextran which has been treated with an aldehyde, as herein set forth, and then dehydrated, as set forth. The gum dextran complex on treatment with the oxygen-containing gas such as air or pure oxygen, loses its stickiness or tackiness and becomes at least of a doughy consistency that can be handled without adherence to the surface of the drying vessel or the hands of the operator. It has also been discovered that the viscosity value of the dried gum dextran complex after being treated as set forth and then ripened can be further increased by incorporating in the gum a limited amount of water to provide a very heavy aqueous suspension or paste, and then dehydrating the material in any suitable manner, including the dehydration in a centrifugal or any other similar apparatus. Thereafter, the material may again be dried by passing an oxygen-containing gas thereover, as for example air or oxygen for a suitable period of time until the material loses its stickiness or tackiness and becomes again of a doughy consistency. While an oxidizing gas is preferable, there may be substituted therefor a neutral gas, as for example nitrogen or any of the gases usually used for drying purposes. It has been ascertained that it is desirable to thoroughly wash the gum dextran material after precipitation with the precipitating agent, as for example, a saturated aliphatic alcohol, the washing step being usually with a saturated aliphatic alcohol, as for example ethyl alcohol, isopropyl alcohol, butyl alcohol, or the like. Good results are obtained when the precipitated material is washed with methyl alcohol when the gum is not to be used for food purposes or does not contact any food. The purpose of this separate washing step is to facilitate the drying of the material when it is subsequently dried either in a centrifugal apparatus or in any filter. It also functions to shorten the usual ripening period of the gum dextran. Methyl alcohol may also be used as a precipitating agent.

It has also been discovered that thick solutions of gum dextran complex can be obtained from colloidal suspensions of the gum dextran complex which has been treated with an aldehyde, and then precipitated and dried, if the particles of the dried non-tacky, non-sticky gum dextran complex are added to water and allowed to absorb the water to their maximum capacity. Gum solutions of higher viscosity, that is thicker solutions, can be obtained employing this procedure than those which are obtained by rapidly dissolving by mechanical agitation or stirring gum dextran which has been treated with an aldehyde, then precipitated and dehydrated and/or dried. The final viscosity of the precipitated mass in solution appears to be intergrated with the amount of swelling of the particles of gum added to the water.

The present invention will be illustrated by the following examples:

EXAMPLE I 400 cc. of a substrate or mash of the character previously set forth, said mash being fermented by *Leuconostoc mesenteroides* (Cienkowski) Van Tieghem, were placed in a large beaker while it was still in a liquid state, and 150 cc. of acetaldehyde added. After mixing and thoroughly stirring, 50 cc. of formaldehyde was added to the fermented liquid substrate and the mixture thoroughly mixed. In order to precipitate the gum dextran from the solution, there was added thereto 150 cc. of isopropyl alcohol and the precipitated gum was allowed to settle. The supernatent liquor was then decanted by suction pump and the relatively wet gum dextran was then transferred to a Petri dish, and dried at a room temperature of about 68° F. To 6.25 grams of this partially dried material, there was added 100 cc. of water. The particles were then allowed to swell, at which time the suspension was agitated until a homogeneous mixture was formed. When 6.5 grams of said homogeneous mixture was added to 100 cc. of water, the viscosity reading on the Brookfield viscometer was 2,000 cps.

EXAMPLE II

A substrate was prepared by mixing cane sugar, tryptone, yeast extract, water and di-potassium phosphate in the proportions herein set forth. This substrate was sterilized at 250° F. for about 30 minutes, and then seeded with 10 cc. of a culture of species *Leuconostoc mesenteroides* (Cienkowski) Van Tieghem. This cultured substrate was then incubated at a temperature varying between 25 and 30° C. The period of incubation was 48 hours. 300 cc. of this incubated material while in liquid state, were introduced into a large beaker and 100 cc. of formaldehyde added and thoroughly mixed with the solution. Then 150 cc. of acetaldehyde was added and thoroughly mixed with the resulting gum dextran solution. The gum dextran solution was then treated with 150 cc. of isopropyl alcohol. After allowing the precipitate to settle and dry about 10 minutes, the precipitated gum material was then transferred to a basket-type centrifugal and centrifuged at R. P. M. of approximately 4,000. The gum was then washed with isopropyl alcohol, while the centrifugal was at maximum speed. This material was then moved from the centrifugal and 4.5 dried grams of the material when added to 100 cc. of water gave a viscosity of 2,400 cps.

EXAMPLE III 250 cc. of the gum dextran solution produced as set forth in Example II were treated with Dry Ice in an amount to freeze the solution, and then allowed to stand overnight. Thereafter the frozen solution was thawed and allowed to stand until it assumed room temperature of 68° F. To this solution there was then added 150 cc. of formaldehyde, and the resulting mixture was stirred and agitated. Thereafter, 250 cc. of isopropyl alcohol was added to precipitate the gum material from its solution. The supernatent liquid was then decanted from the precipitated gum dextran, and thereafter the precipitate was transferred to a centrifugal operating at 4000 R. P. M. The material was not washed in the centrifugal with any washing agent, as for example any of the monatomic aliphatic alcohols. 4.8 grams of the material which was dehydrated and dried in the centrifugal were added to 100 cc. of water to produce an aqueous solution of gum dextran having a viscosity of 5,000.

EXAMPLE IV 2,000 cc. of the gum dextran solution produced as set forth in Example II were transferred to a pressure bottle and heated in a sterilizer under 15 pounds pressure to a temperature between about 212 and 215° for a period of 15 minutes and one hour, and then the pressure was released. Upon cooling, the gum dextran solution was then treated first with 67 cc. of 37% formaldehyde; after thoroughly mixing there was added 100 cc. of acetaldehyde. The gum dextran formed an aldehyde complex. This complex was then precipitated by adding to the so-treated gum dextran solution 100 cc. of isopropyl alcohol. The resulting mass was then partially dried at room temperature of 68° F. 4.7 grams of this material added to 100 cc. of water produced a gum dextran solution having a viscosity of 2080 cps.

EXAMPLE V 250 cc. of the gum dextran solution produced as set forth in Example II was left to stand overnight in Dry Ice. Thereafter, the mixture was then thawed and the solution after thawing was treated first with 100 cc. of formaldehyde, and then after stirring there was added 50 cc. of acetaldehyde. The so-treated mass was then mixed with 200 cc. of isopropyl alcohol, which functions to precipitate the gum dextran-aldehyde complex. The latter was then centrifuged in the manner previously set forth, and then washed with alcohol. Thereafter, the material was dried at room temperature of 68° F. 4.6 grams of the material taken on a dry basis was then added to 100 cc. of water, and the resulting gum dextran solution had a viscosity of 3,450 cps.

EXAMPLE VI 250 cc. of gum dextran solution produced as set forth in Example II were frozen by leaving the solution overnight with Dry Ice therein. Thereafter, the frozen solution was thawed at a room temperature of 68° and treated with 100 cc. of formaldehyde. The solution was thoroughly stirred in order that the formaldehyde could physically and/or chemically react with the gum dextran. Then the gum dextran-complex was precipitated from the solution by adding to the solution 250 cc. of isopropyl alcohol. The supernatant liquor was then decanted from the precipitated gum, and the latter was then washed with isopropyl alcohol. Instead of using isopropyl alcohol, any of the fairly volatile monatomic aliphatic alcohols could be used containing from 1 to 10 carbon atoms in its molecule. The washed gum dextran-complex was then transferred to a centrifugal and dehydrated for a period of 20 minutes, the centrifugal operating at a speed of between 2000 and 4000 R. P. M. The partially dehydrated gum dextran complex was then washed with isopropyl alcohol or an equivalent alcohol, as specified, and taken to dryness. 3 grams of this dried material when added to 175 cc. of water produced an aqueous gum solution having a viscosity of 3800 cps.

EXAMPLE VII 250 cc. of gum dextran solution produced as set forth in Example II were treated with Dry Ice in an amount sufficient to freeze the solution. The solution was allowed to stand overnight and then thawed at room temperature. The thawed solution of gum dextran was then treated with 100 cc. of formaldehyde. Thereafter, there was added 25 cc. of acetaldehyde and the mixture was thoroughly stirred and agitated in order that by a time reaction, if necessary, the formaldehyde and the acetaldehyde reacted with the gum dextran to form a gum dextran-aldehyde complex. Thereafter, the solution containing the soluble gum dextran-aldehyde complex was treated with an alcohol in order to precipitate the gum mass from its solution. The supernatant liquor was then decanted from the gum mass and the resulting precipitated gum mass was thoroughly washed with isopropyl alcohol. Thereafter, it was centrifuged for 20 minutes, and then aged, oxidized and ripened for a period of 72 hours in a current of air at a temperature preferably varying between 85° and 105° F. 5.4 grams of this material when added to 130 cc. of water produced a gum solution or suspension having a viscosity of 12,400 cps.

EXAMPLE VIII 250 cc. of gum dextran solution produced as set forth in Example II were frozen with Dry Ice and left overnight. Thereafter, the gum dextran material was allowed to thaw. The material was maintained at room temperature and then treated first with 150 cc. of formaldehyde, and then with 50 cc. of acetaldehyde. The so-treated material was then thoroughly mixed in order to hasten the formation of the gum dextran-aldehyde complex. Thereafter, 150 cc. of isopropyl alcohol was added to the gum dextran solution and the gum dextran precipitated therefrom. The precipitate and its liquid was allowed to stand for about 10 minutes, and thereafter the supernatant liquor was withdrawn from the precipitate by decantation. The precipitated gum mass was then placed in a centrifugal and washed with alcohol. The centrifugal was then operated for about 20 minutes and the material was aged for a period varying between 40 and 72 hours. This partially dried material was further dried at room temperature, that is 68°, and thereafter a limited amount of water was added, as for example 50 cc. to form a paste; obviously, this may vary considerably. The paste was thereafter dried at a temperature of 68°, washed with isopropyl alcohol and then redried at room temperature. When 3 grams of the redried material was added to 100 cc. of water and the suspension agitated, it had such a heavy viscosity that it could not be read on the viscometer.

EXAMPLE IX 250 cc. of gum dextran solution produced as set forth in Example II were treated with Dry Ice in an amount to freeze the solution. After freezing, the frozen gum dextran solution was thawed and treated with 50 cc. of isopropyl alcohol while stirring and agitating. There was then added 50 cc. of formaldehyde, and the so-treated gum dextran material was again stirred and agitated. Thereafter, there was added to the so-treated gum dextran solution 10 cc. of acetaldehyde, and then this was followed by 50 cc. of formaldehyde. After a thorough agitation of said extracting agents with the cultured gum dextran solution, there was added a precipitating agent in the amount of 150 cc. of isopropyl alcohol. The supernatant liquor was then decanted, and the precipitate washed with isopropyl alcohol and then centrifuged. The material was then transferred from the centrifuge and dried at room temperature for two days. The viscosity of the 5.4% aqueous solution (dry weight) was 4,200 cps. It appears that gum dextran can be precipitated from solutions which have been fermented with species *Leuconostoc mesenteroides* (Cienkowski) Van Tieghem, and in practically its original form with alcohols, after the solution has been treated with an aldehyde, and by this method the gum requires or retains an exceedingly high viscosity potential in aqueous suspension. The aldehydes react to form aldehyde complexes with the gum dextran, and the alcohol which is added to the so-treated gum dextran solution tends to dehydrate and precipitate the aldehyde-gum dextran complex. Where herein it has been stated that the precipitating agent, such as an aliphatic alcohol having the formula $C_nH_{2n+1}OH$ is used to precipitate, what is precipitated is the gum dextran which contains a certain amount of the gum dextran-aldehyde reaction product. When gum dextran is treated in the manner set forth, the material dries easily, is not sticky, and is capable of producing an aqueous suspension which has the property of forming viscous solutions comparable to that formed when gum tragacanth is suspended in an aqueous suspension medium. It has been found that when 100 cc. of a polysaccharide substrate which has been fermented and which contains gum dextran due to the fermentation of the polysaccharide present in the substrate, are treated with 50 cc. of acetaldehyde, thoroughly mixed and then treated with 50 cc. of propanol, a precipitate is obtained which in 5% aqueous suspension, calculated on dry weight, produces a viscosity of 2500 cps. Even higher viscosities can be obtained by substitution of a part of the acetaldehyde with formaldehyde. Further, when treating the gum dextran solution with formaldehyde, it has been ascertained that the addition of a small proportion of acetaldehyde tends to increase the rate of drying of the recovered gum dextran. More specifically, it has been discovered that the best results are obtained by treating 250 cc. of completely fermented mash of the character herein set forth, and having an original viscosity of between 2000 and 6000 cps. on the Brookfield viscometer, with 150 cc. of formaldehyde and 25 cc. of acetaldehyde, the material being thoroughly mixed after the addition of each of these extraction agents, and then 250 cc. of isopropyl alcohol added to precipitate the gum dextran-aldehyde complex. Other aldehydes which can be used are paraformaldehyde, propyl aldehyde, butyraldehyde, isobutyraldehyde, glyoxal (biformyl), and the like. Instead of using formaldehyde, paraformaldehyde may be used. The aldehyde or paraformaldehyde may be used alone or in combination with any of the aldehydes previously herein set forth.

In general, it may be stated that it is the aldehyde radical of the aldehydes which are used which combines with the gum dextran, and therefore any aldehyde may be used which is capable of furnishing the aldehyde radical. The fermented substrate containing gum dextran may be treated with an aldehyde gas, as for example formaldehyde gas, and the gum dextran will be modified either physically or chemically, so as to impart to the so-treated gum dextran the ability to develop such a high viscosity potential that it will form aqueous solutions having viscosities ranging between 1400 and 80,000 cps., and more limitedly between about 1400 and about 16,000 or about 20,000 cps., the concentration of the gum suspended in aqueous solution preferably varying between about 1% and about 5%. Aqueous suspensions of good viscosity are obtained when the concentration is between 2 and about 5 or 6%, and between about 3 and 5 or 6%. In general, the concentration of the aqueous suspension of the gum mass which has been produced as herein set forth varies between 1% and 7 and 8%. Even higher concentrations may be obtained.

In general, it may be stated that when the extracted gum dextran material is dried and treated, as herein set forth, there are obtained viscosities which are comparable to gum tragacanth, which has one of the highest viscosity potentials of any of the natural gums.

It is desirable that the precipitated gum dextran should be dried in a gaseous oxidizing current, as for example warm air and at a temperature between 85° F. and 105° F. Higher temperatures tend to reduce the viscosity values of the extracted gum. While the high viscosity values are not destroyed at temperatures higher than about 105° F., there is a tendency at higher temperatures to impair said high viscosity levels. It has been found that this aeration is highly desirable, not only for the purpose of accelerating the drying of the gum mass, but also for the purpose of oxidation, since it has been ascertained that the exposure of the gum dextran to oxygen gas is often beneficial.

The following Table I sets forth the data relative to a series of supplemental experiments in which the fermented substrate was of the character herein previously set forth, the substrate containing cane sugar and nutrient mediums such as tryptone, yeast extract, di-potassium phosphate, and the like, said substrates having been seeded with a culture of species *Leuconostic mesenteroides* (Cienkowski) Van Tieghem, and then incubated. The table also sets forth the extraction agents which include the aldehydes used and the precipitating agent. The terms wet grams and dry grams refer to the condition of the material from which the stated viscosity is obtained. In some cases, the extracted material is in a fairly wet form, and it then is referred to as wet grams, and in other cases the gum mass recovered was dried, and then the amount thereof recovered is referred to as dry grams.

Table I

| A | B | C | D | E | F | G |
|---|---|---|---|---|---|---|
| Example No. | cc's of fermented substrate | Extraction Agents, in cc's and Reactants | Gum Recovery in grams | | cc's Water | Viscosity in centipoises |
| | | | Wet Grams | Dry Grams | | |
| 1 | 200 | Ethyl alcohol | 20 | | 150 | 0 |
| 2 | 200 | Isopropyl alcohol | 20 | | 150 | 0 |
| 3 | 400 | 150-acetaldehyde<br>50-formaldehyde<br>150-isopropyl alcohol | 6.5 | | 100 | 2,000 |
| 4 | 300 | 100-formaldehyde<br>150-acetaldehyde<br>150-isopropyl alcohol | | 4.5 | 100 | 2,400 |
| 5 | 250 | 150-formaldehyde<br>250-isopropyl alcohol | | 4.8 | 100 | 5,000 |
| 6 | 200 | 67-formaldehyde<br>100-acetaldehyde<br>100-isopropyl alcohol | 4.7 | | 100 | 2,080 |
| 7 | 250 | 100-formaldehyde<br>50-acetaldehyde<br>200-isopropyl alcohol | | 4.6 | 100 | 3,450 |
| 8 | 250 | 100-formaldehyde<br>250-isopropyl alcohol | 3.0 | | 175 | 3,800 |
| 9 | 250 | 100-formaldehyde<br>25-acetaldehyde<br>250-isopropyl alcohol | | 5.4 | 130 | 12,400 |
| 10 | 250 | 150-formaldehyde | 3.0 | | 100 | too heavy to be read |
| 11 | 200 | 50-isopropyl alcohol<br>50-formaldehyde<br>10-acetaldehyde<br>(added and stirred, followed by)<br>50-formaldehyde<br>150-isopropyl alcohol | | 5.4 | | 4,200 |

Referring to Example 3 of the above table, 400 cc. of culture fermented substrate, produced as herein set forth, were treated with 150 cc. of acetaldehyde and 50 cc. of formaldehyde. The resulting mass was then treated with isopropyl alcohol to precipitate therefrom the gum dextran complex. There is obtained from 400 cc. of the fermented substrate upon treatment as specified, 6.5 grams of gum. This was "wet grams." When the gum was dissolved in 100 cc. of water, the viscosity and cps. was 2,000. The remaining experiments in Table I indicate the viscosities obtained under the treatment conditions set forth.

In general, it may be stated that when the mashes herein set forth and those set forth in applicant's prior patent, No. 2,392,258, are fermented, the amount of gum dextran which is theoretically formed is about 50% by weight of the sugar. Therefore, when using a 20% sugar solution, there is a yield of about 10% of gum dextran.

In the present process, instead of fermenting the polysaccharide in the presence of a nutrient medium including tryptone, the fermentation may be carried out using a nutrient medium comprising blood and autolyzed yeast, or a mixture of blood and tankage in the presence of autolyzed yeast. The term "tankage" as herein used refers to the press cake obtained from the abbatoir by-products plants. This press cake is usually dried, broken up, and used in the industry as a filler for fertilizer compositions. A typical analysis of tankage is as follows:

Crude protein, not less than 60%
Crude fat, not less than 6.0%
Crude fibre, not less than 3.0%

The cane juice which is fermented may be in the form of filter press mud.

While the gum dextran is preferably produced by fermentation of a polysaccharide as, for example, cane sugar with species *Leuconostoc mesenteroides* (Cienkowski) Van Tieghem, there are a number of other bacteria which are well known to ferment polysaccharides and especially sugar solutions in the presence of a nutrient medium. These bacteria may be used in producing the gum dextran which is treated in accordance with the present invention. However, the preferable factor is genus *Leuconostoc mesenteroides* (Cienkowski) Van Tieghem, as herein specified, as this produces the best yield.

Usually the amount of di- or polysaccharide present in the aqueous substrate varies from 10% to 30%. Satisfactory results are obtained when 10% to 15% of the sucrose or the like is present. The amount of sucrose present influences the amount of gum dextran produced by the bacterial fermentation.

While the removal of water from the gum dextran resulting from precipitation of the gum dextran-aldehyde complex is preferably effected by centrifuging, it is to be understood that any of the prior art methods of drying may be used. Centrifugals are merely an efficient apparatus for effecting the drying. Other prior art apparatus or methods may be substituted for the ones herein disclosed.

It is desired to point out that the viscosity of an aqueous solution depends on the properties of the gum dextran, that is, its ability to form the viscous solution and also the amount of gum dextran suspended in a given amount of water. In Table I various concentrations of the herein produced gum mass in water are set forth. It is obvious that if more water is used, the viscosity of the resulting solution will be less even if the same amount of gum is used; and if less water is used, the same amount of gum will produce a more viscous solution once the gum dextran mixture or complex is endowed with the property of forming a viscous solution. Therefore, one of the essential points of novelty of the present invention is to confer or endow upon the gum dextran produced by bacterial fermentation the property of forming a viscous gum solution. Thereafter the concentration of the viscous solution can be controlled to give various viscosities defined in centipoises.

While the alcohols are, as stated, preferably used as a precipitating agent to recover the gum material from the gum dextran-aldehyde complex, other prior art precipitating agents may be used. Since the precipitation of gum dextran from suspension in an aqueous solution is well known in the art, it is not desired to be limited to an alcohol as the precipitating agent. The alcohols which have the formula $C_nH_{2n+1}OH$ are set forth on page 28 of Hackh's Chemical Dictionary, third edition, The Blakiston Company, Philadelphia. Any of the monatomic aliphatic alcohols which are liquid may be used to precipitate the gum dextran from the fermented or incubated substrate after the same has been treated as herein set forth, said treatment including the addition of an aldehyde of the character set forth or the preliminary dehydrating step followed by treatment with an aldehyde.

It is preferred to use an alcohol having a low boiling point, that is below the boiling point of butyl alcohol. Butyl alcohol and higher alcohols produce a product which is exceedingly difficult to dry, and tends to be more of a plastic than a gum.

The liquid aliphatic saturated aldehydes which are suitable for carrying out the present invention are set forth in Hackh, supra, on page 29. The best results are obtained by using the saturated aliphatic aldehydes containing between 1 and 4 carbon atoms in the molecule. Those aldehydes containing between 5 and 6 carbon atoms may also be used.

The sucrose-containing mash which has been fermented as herein set forth may be treated with acetaldehyde or formaldehyde, or by a mixture of the two. The gum dextran-aldehyde complex may thereafter be precipitated by any of the alcohols herein set forth, and the supernatent liquor decanted from the precipitate. The latter may then be washed with any medium which is insoluble, preferably one of the alcohols, and then centrifuged for 20 to 45 minutes at a centrifugal speed of between 2,000 and 5,000 R. P. M. The partially dried gum, and the latter is in a fairly dry form, is then aged in a current of air at a temperature which may vary between 50° and 150° F., but preferably varies between 85° and 105° F.

Relative to mixtures of aldehydes, in Example V the mixture is made up of 33⅓% acetaldehyde and 66⅔% formaldehyde. In Example VII the aldehyde mixture contains 20% acetaldehyde and 80% formaldehyde. In Example VIII the acetaldehyde is present in the formaldehyde-acetaldehyde mixture in an amount of 25%. In Example IX the formaldehyde-acetaldehyde mixture contains 10% of acetaldehyde. These are all examples of mixtures where the formaldehyde is present in a predominating quantity, which means over 50%. However, the acetaldehyde may be present in a predominating quantity, as shown by Example IV. In general, the amount of acetaldehyde present in the formaldehyde-acetaldehyde mixture may vary between 5% and 90%. Other aldehydes herein set forth may be mixed in similar proportions.

After the centrifuged or filtered material has been dried to a fairly dry form, it may be further dried either in a vacuum, or by a current of air operating in a vacuum, or by a current of air operating at atmospheric pressure or above atmospheric pressure. It is, therefore, clear that it is not necessary to dry in a current of air, but that the substantially complete drying which functions to age and ripen the gum dextran, all as previously set forth, may be effected in a vacuum and the temperature of drying in a vacuum may vary, as stated, from 50° to 105° F. but is preferably between 85° and 105° F. The lower temperature is not very important. The upper temperature preferably should not exceed about 105° F. for the reasons previously pointed out.

Employing the procedure above set forth, high viscosity ranges as set forth are obtained when gum dextran produced in the manner referred to is treated with an aldehyde and the treated mass recovered from solution either by mechanical means or by precipitation with the usual precipitating agents including the alcohols. In other words, at concentrations of around 3%, 4%, or 5% the gum dextran material produces a high viscosity solution. However, when the concentration of the gum in the aqueous solution is below about 3%, the viscosity of the solution begins to break somewhat from the very excellent viscosities obtained at concentrations above 3% of the gum in aqueous solution, and at low concentrations of say 1%, the viscosity of the solution may be very substantially reduced. It has been discovered that by the procedure hereinafter outlined, this break in viscosity of the aqueous solution can be substantially inhibited so that at 2% and 1% the suspension of the gum in aqueous solution is one that has substantial viscosity. It has been ascertained that if the pH of the substrates which have been completely fermented by genus *Leuconostoc mesenteroides* (Cienkowski) Van Tieghem is raised to a pH of between 7 and 8, and the solution allowed to stand at a temperature between 50° and 80°, and then the aldehyde is added and the solution is kept at a temperature of about 50° and 75° for a suitable length of time, as for example one hour, and the solution then neutralized to bring the pH to 7, the dextran-aldehyde complex precipitated with isopropyl alcohol or extracted by centrifugal means or by filtering and then drying, produces a material which on suspension in water yields a product which gives exceedingly high viscosities at low concentrations. The following is a specific example in accordance with the above procedure.

EXAMPLE X

To 30 grams of gum dextran extracted from fermented substrates fermented with *Leuconostoc mesenteroides* (Cienkowski) Van Tieghem, there was added 400 cc. of water, and the material made into a homogeneous colloidal suspension by agitating the mixture. There was then added 5 grams of sodium hydroxide to raise the pH of the solution to 8.5. After the addition of the sodium hydroxide, the material is left to stand for 4 hours at room temperature, that is at about 20 to 25° C. or 68° F. The aldehyde was then added and the solution was then warmed to 75° C. and again allowed to stand for about 1 hour. The pH was adjusted so that the solution was approximately neutral. This adjustment to a pH of 7 was effected by adding monochloracetic acid. The resulting gum mass was then precipitated with isopropyl alcohol and the precipitate was dried in an oven at 105° F. The viscosity potentials of this product in water are set forth in the following Table II.

*Table II*

| Concentration | Viscosity in cps. |
|---|---|
| 5% | 13,000 |
| 3% | 8,400 |
| 2% | 2,800 |
| 1% | 800 |

Viscosities as high as 16,000 cps. have been obtained employing the invention herein set forth. Employing the above procedure, a 3% concentration of the gum in aqueous solution had a viscosity of 16,000 cps. and 5% concentration of the gum in aqueous solution had a viscosity as high as 40,000 cps. It is desired to point out that gum dextran which was on the market prior to the present invention, said gum dextran being produced by the prior art methods of extraction and purification, was a tenacious and mucilaginous product which had a very low viscosity, even in high aqueous suspensions. For example, a high concentration of prior art gum dextran produced by the fermentation process herein set forth had very little viscosity even in a 5% aqueous concentration. For example, the concentration of gum dextran produced by fermenting a substrate of the character set forth with *Leuconostoc mesenteroides* (Cienkowski) Van Tieghem in a 5% suspension had an initial viscosity of between 100 and 200 cps.

The high viscosity gum material produced in accordance with the present invention exhibits high tenacity and cohesiveness, and is adapted for use in the oil drilling field, and particularly may be incorporated in a mud-laden drilling fluid containing a mud base, the gum of the present invention acting as a suspension agent for the mud base. The gum mass produced in accordance with the present invention may be used as an emulsifying, suspending, jellying, thickening, embodying agent. It is especially valuable as a stabilizer for ice cream. It may be used in food products of a foam, jelly or emulsion nature. It may also be used in cake icings and whipping cream, in hand emollients, as an addition to boiler feed water to prevent encrustation, and in pharmaceuticals.

What is claimed is:

1. The method comprising fermenting an aqueous polysaccharide substrate in the presence of species *Leuconostoc mesenteroides* (Cienkowski) Van Tieghem, and producing therefrom an aqueous suspension of gum dextran, treating said aqueous suspension with a saturated water-soluble aliphatic aldehyde, and recovering the resulting gum from the so-treated mass.

2. The method defined in claim 1 in which the polysaccharide is sucrose.

3. The method comprising fermenting an aqueous polysaccharide substrate in the presence of species *Leuconostoc mesenteroides* (Cienkowski) Van Tieghem, and producing therefrom an aqueous suspension of gum dextran, partially dehydrating said aqueous suspension of gum dextran, treating said aqueous suspension with a saturated water-soluble aliphatic aldehyde, and recovering the resulting gum from the so-treated mass.

4. The method comprising fermenting an aqueous polysaccharide substrate in the presence of species *Leuconostoc mesenteroides* (Cienkowski) Van Tieghem, and producing therefrom an aqueous suspension of gum dextran, simultaneously removing oxygen from the fermented gum dextran while freezing the fermented product by treating the latter with Dry Ice, then thawing the frozen gum dextran product, treating the so-produced gum dextran with a saturated water-soluble aliphatic aldehyde, and recovering the resulting gum from the so-treated mass.

5. The method comprising fermenting an aqueous polysaccharide substrate in the presence of species *Leuconostoc mesenteroides* (Cienkowski) Van Tieghem, and producing therefrom an aqueous suspension of gum dextran, treating said aqueous suspension with a saturated water-soluble aliphatic aldehyde, recovering the resulting gum from the so-treated mass, dehydrating the recovered gum, and then aging and oxidizing the dehydrated material in a current of an oxygen-containing gas while inhibiting any substantial reduction in the viscosity value of the resulting gum, said treatment with said gas being continued until the gum dextran loses its stickiness and tackiness and assumes at least a doughy consistency.

6. The method comprising fermenting an aqueous polysaccharide substrate in the presence of species *Leuconostoc mesenteroides* (Cienkowski) Van Tieghem, and producing therefrom an aqueous suspension of gum dextran, partially dehydrating said aqueous colloidal suspension of gum dextran, treating the partially dehydrated product with a saturated water-soluble aliphatic aldehyde, recovering gum dextran from the so-treated mass, dehydrating the recovered gum dextran, and then aging and oxidizing the dehydrated material in a current of an oxygen-containing gas while inhibiting any substantial reduction in the viscosity value of the resulting gum, said treatment with said gas being continued until the gum dextran loses its stickiness and tackiness and assumes at least a doughy consistency.

7. The method defined in claim 6 in which the gum dextran recovered after the partially dehydrated product is treated with a saturated aliphatic aldehyde, is further dehydrated by centrifugal action.

8. The method comprising fermenting an aqueous polysaccharide substrate in the presence of species *Leuconostoc mesenteroides* (Cienkowski) Van Tieghem, and producing therefrom an aqueous suspension of gum dextran, treating said aqueous suspension with a saturated water-soluble aliphatic aldehyde, recovering the resulting gum from the so-treated mass, dehydrating the recovered gum, removing impurities from the dehydrated material, partially drying the purified gum, adding water thereto in an amount to form a paste, and again dehydrating the resulting paste.

9. The method defined in claim 8 in which the gum is recovered by treating the gum dextran-aldehyde reaction mass with an alcohol.

10. The method defined in claim 1 in which the aldehyde is acetaldehyde.

11. The method defined in claim 3 in which the aldehyde is acetaldehyde.

12. The method defined in claim 1 in which the aldehyde is a mixture of acetaldehyde and formaldehyde.

13. The method comprising fermenting an aqueous sucrose substrate in the presence of species *Leuconostoc mesenteroides* (Cienkowski) Van Tieghem and producing therefrom an aqueous suspension of gum dextran, treating said aqueous suspension with a saturated water-soluble aliphatic aldehyde, recovering the resulting gum from the aqueous suspension, partially drying the recovered gum and thereafter aging the latter in a current of air at a temperature of not over 105° F.

14. The method comprising fermenting an aqueous sucrose substrate in the presence of species *Leuconostoc mesenteroides* (Cienkowski) Van Tieghem and producing therefrom an aqueous suspension of gum dextran, treating said aqueous suspension with a mixture of acetaldehyde and formaldehyde, recovering the resulting gum from the aqueous suspension, partially drying the recovered gum, treating the latter with water to form a paste for a period varying between two hours and twelve hours, and again drying the resulting paste.

15. The reaction product of a saturated water-soluble aliphatic aldehyde and gum dextran produced by the bacterial fermentation of an aqueous substrate of sucrose in the presence of species *Leuconostoc mesenteroides* (Cienkowski) Van Tieghem, said reaction product being soluble in water.

16. The reaction product of a saturated water-soluble aliphatic aldehyde and gum dextran produced by the bacterial fermentation of an aqueous substrate of sucrose in the presence of species *Leuconostoc mesenteroides* (Cienkowski) Van Tieghem, said gum dextran having been thereafter dehydrated.

17. The reaction product of formaldehyde and gum dextran produced by the bacterial fermentation of an aqueous substrate of sucrose in the presence of species *Leuconostoc mesenteroides* (Cienkowski) Van Tieghem.

18. An aqueous suspension of the reaction product of a water-soluble aliphatic aldehyde and gum dextran produced by the bacterial fermentation of an aqueous solution of sucrose in the presence of species *Leuconostoc mesenteroides* (Cienkowski) Van Tieghem, said reaction product being soluble in water, said suspension containing between about 1% and about 8% of the gum reaction product and having a viscosity range between about 14,000 and about 20,000 centipoises.

19. The method comprising fermenting an aqueous polysaccharide substrate in the presence of species *Leuconostoc mesenteroides* (Cienkowski) Van Tieghem, and producing therefrom an aqueous suspension of gum dextran, freezing said aqueous suspension, thawing the frozen mass, treating the resulting gum dextran suspension with a saturated water-soluble aliphatic aldehyde, and recovering the resulting gum from the so-treated mass.

20. The method defined in claim 19 in which the freezing is effected with Dry Ice.

21. The method defined in claim 19 in which the saturated water-soluble aliphatic aldehyde contains between 1 and 6 carbon atoms in the molecule thereof.

22. The method comprising fermenting an aqueous polysaccharide substrate in the presence of species *Leuconostoc mesenteroides* (Cienkowski) Van Tieghem, and producing therefrom an aqueous suspension of gum dextran, freezing said aqueous suspension, thawing the frozen mass, treating the resulting gum dextran suspension with a saturated water-soluble aliphatic aldehyde, recovering gum dextran from the treated mass, dehydrating the recovered gum dextran and then ageing and oxidizing the dehydrated material in a current of an oxygen-containing gas while inhibiting any substantial reduction in the viscosity value of the resulting gum, said treatment with said gas being continued until the gum dextran loses its stickiness and tackiness and assumes at least a doughy consistency.

23. The method comprising fermenting an aqueous polysaccharide substrate in the presence of species *Leuconostoc mesenteroides* (Cienkowski) Van Tieghem, and producing therefrom an aqueous suspension of gum dextran, treating said aqueous suspension with a mixture of formaldehyde and acetaldehyde in which the formaldehyde predominates, and recovering the resulting gum from the so-treated mass.

24. The method comprising fermenting an aqueous polysaccharide substrate in the presence of species *Leuconostoc mesenteroides* (Cienkowski) Van Tieghem, and producing therefrom an aqueous suspension of gum dextran, treating said aqueous suspension with glyoxal, and recovering the resulting gum from the so-treated mass.

25. The reaction product of formaldehyde and gum dextran produced by the bacterial fermentation of an aqueous polysaccharide substrate in the presence of species *Leuconostoc mesenteroides* (Cienkowski) Van Tieghem.

26. The reaction product of acetaldehyde and gum dextran produced by the bacterial fermentation of an aqueous polysaccharide substrate in the presence of species *Leuconostoc mesenteroides* (Cienkowski) Van Tieghem.

27. The reaction product of a mixture of acetaldehyde and formaldehyde with gum dextran produced by the bacterial fermentation of an aqueous polysaccharide substrate in the presence of species *Leuconostoc mesenteroides* (Cienkowski) Van Tieghem.

WILLIAM L. OWEN.

REFERENCES CITED

The following references are of record in the file of this patent:

Evans et al., "Adv. in Carbohydrate Chem.," vol. 2, 1946, p. 210–218, 9 pages.